Patented June 12, 1951

2,556,574

UNITED STATES PATENT OFFICE 2,556,574

INDOLOPTERIDINES AND PROCESS FOR PREPARING SAME

Norman Robert Campbell, Maurice Edward Hugh Fitzgerald, Henry Oswald Jackson Collier, and James Henry Dunsmuir, London, England, assignors to Allen & Hanburys Limited, London, England, a British company No Drawing. Application June 6, 1950, Serial No. 166,529. In Great Britain June 24, 1949

12 Claims. (Cl. 260—251.5)

This invention relates to anti-bacterial substances.

We have now prepared certain new pteridines which are very effective anti-bacterial substances when tested in vitro against *Vibrio cholerae* in a peptone water medium. The new pteridines of the present invention are compounds of the general formula:

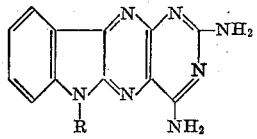

I where R is hydrogen or a methyl, ethyl or propyl group.

It has now been discovered, according to this invention, that compounds of the general Formula I can be produced by condensation of 5-nitroso-2.4.6-triaminopyrimidine with an O-acyl-indoxyl or an O-acyl-N-alkyl-indoxyl where the alkyl group is a methyl, ethyl or propyl group.

Thus, according to the process of the present invention for the manufacture of pteridines of the general Formula I, 5-nitroso-2.4.6-triaminopyrimidine is condensed with an O-acyl-indoxyl or an O-acyl-N-alkyl-indoxyl where the alkyl group is a methyl, ethyl or propyl group, in solution or suspension in a solvent in the presence of a condensing agent.

A mixture of solvents may be used if desired. The reaction can be formulated as follows:

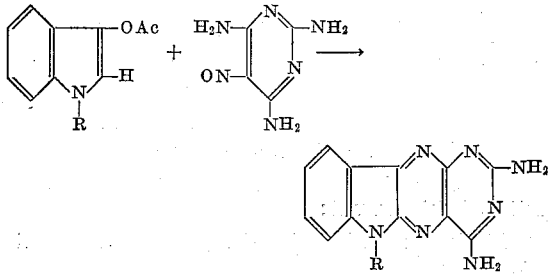

R being hydrogen or a methyl, ethyl or propyl group.

The process of the invention may be conveniently carried out as follows: Solutions or suspensions of the reactants in suitable solvents are mixed, treated with the optimum quantity of the chosen condensing agent, such as piperidine, and heated together under reflux, or at elevated temperature in a closed reaction vessel for a time which varies with the nature of the solvent employed and with the reaction temperature. On completion of the reaction the solvent may be wholly or partly removed by distillation, if necessary, and the residue extracted with hot water. The solid product is extracted with small quantities of a solvent such as alcohol, methanol or acetone and further purified by recrystallisation or by chromatography.

The following examples illustrate how the process of the invention may be carried into effect:

1. 154 gms. of 5-nitroso-triaminopyrimidine are suspended in 25 litres of boiling water and boiled under reflux in an atmosphere of nitrogen for thirty minutes. 100 ml. of piperidine are then added and an alcoholic solution of 189 gms. of O-acetyl-N-methyl-indoxyl added slowly with vigorous stirring. The mixture is boiled under reflux, with continued stirring, still in an atmosphere of nitrogen, for a further five to ten minutes, then filtered hot and the separated solid boiled once with water, then once or twice with alcohol, until free from extraneous blue colour. The orange-coloured product may be recrystallised from dimethyl-formamide or pyridine, or from alcohol in an extraction apparatus. It then melts with decomposition between 370 and 380° C.

2. A mixture of 4.6 gms. of 5-nitrosotriaminopyrimidine with 800 ml. of water was boiled under reflux for twenty minutes in a slow stream of nitrogen. 4 ml. of piperidine were added, followed by a solution of 5.6 gms. of O-acetyl-N-ethyl-indoxyl in 100 ml. of ethyl alcohol. The mixture was then boiled under reflux, in an atmosphere of nitrogen, for ten minutes and filtered. The crude solid product was washed with hot water and with alcohol then extracted with hot alcohol and recrystallised from pyridine. The orange-yellow product, 2.4-diamino-1'-ethylindolo-(2'.3'-6.7) pteridine, melted at 356-357° C.

3. A mixture of 2.5 gms. of 5-nitrosotriaminopyrimidine with 450 ml. of water was boiled under reflux for twenty minutes in a slow stream of nitrogen. 4 ml. of piperidine were added, followed by a solution of 3 gms. of O-acetyl-N-n-propyl-indoxyl in 150 ml. of alcohol. The mixture was then boiled under reflux, in an atmosphere of nitrogen, for fifteen minutes, cooled and filtered. The crude solid product was washed with water and with alcohol and recrystallised from alcohol. The yellow product, 2.4-diamino-1'-n-propylindolo-(2'.3'-6.7)pteridine, melted at 328-329° C.

4. A mixture of 4.6 gms. of 5-nitrosotriaminopyrimidine with 800 ml. of water was boiled under reflux for twenty minutes in a slow stream of nitrogen. 10 ml. of a ten per cent solution of dimethylamine in alcohol were added followed by a solution of 5.6 gms. of O-acetyl-N-methylindoxyl in 50 ml. of alcohol. The mixture was then boiled under reflux for four minutes and filtered. The crude solid product was washed with hot water and with alcohol, extracted thoroughly with boiling alcohol and recrystallised from pyridine. The orange-yellow product, 2.4-diamino - 1′ - methylindolo-(2′.3′-6.7) pteridine, melted at 373–374° C.

5. A mixture of 4.6 gms. of 5-nitrosotriaminopyrimidine with 800 ml. of water was boiled under reflux for twenty minutes in a slow stream of nitrogen. 4 ml. of piperidine were added, followed by a solution of 5.2 gms. of O-acetylindoxyl in 100 ml. of water. The mixture was then boiled under reflux for fifteen minutes and filtered. The crude solid product was washed with hot water and with hot alcohol and recrystallised from pyridine. The orange-yellow product, 2.4-diamino-indolo-(2′.3′-6.7) pteridine, melted above 370° C.

The pteridines of the present invention are inhibitory to the growth of *Vibrio cholerae* in a peptone water medium in high dilution.

All the above-mentioned compounds were tested against *Vibrio cholerae* in peptone water and the values shown in the following table were obtained for the minimum inhibitory concentration in μg. per ml. after 24 hours against $10^3$ organisms per ml. In the table, R is the substituent in the formula given above.

| R | Minimum inhibitory concentration after 24 hours |
|---|---|
| Hydrogen | 10 |
| Methyl | 2.5 |
| Ethyl | 5 |
| n-Propyl | 20 |

What we claim is:

1. New pteridines of the general formula:

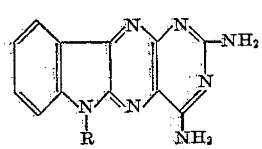

where R is selected from the group consisting of hydrogen and alkyl groups containing less than four carbon atoms.

2. 2.4-diamino-1′-ethylindolo - (2′.3′-6.7) pteridine.

3. 2.4-diamino-1′ - n - propylindolo-(2′.3′-6.7) - pteridine.

4. 2.4 - diamino - 1′ - methylindolo-(2′.3′-6.7) - pteridine.

5. 2.4-diamino-indolo-(2′.3′-6.7) pteridine.

6. A process for the manufacture of pteridines of the general formula:

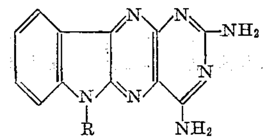

where R is selected from the group consisting of hydrogen and alkyl groups containing less than four carbon atoms, which comprises condensing 5-nitroso-2.4.6-triaminopyrimidine with an indoxyl derivative selected from the group consisting of O-acyl-indoxyls and O-acyl-N-alkyl-indoxyls in which the alkyl group contains less than four carbon atoms in the presence of a solvent and of a condensing agent of the acid binding type.

7. A process according to claim 6 wherein the condensing agent is piperidine.

8. A process for the manufacture of 2.4-diamino-1′-ethylindolo-(2′.3′-6.7) pteridine which comprises condensing 5-nitroso - 2.4.6-triaminopyrimidine with O-acetyl-N-ethyl-indoxyl in the presence of ethyl alcohol and of piperidine as a condensing agent of the acid binding type.

9. A process for the manufacture of 2.4-diamino-1′ - n - propylindolo - (2′.3′-6.7) pteridine which comprises condensing 5-nitroso-2.4.6-triaminopyrimidine with O-acetyl-N-n-propyl-indoxyl in the presence of ethyl alcohol and of piperidine as a condensing agent of the acid binding type.

10. A process for the manufacture of 2.4-diamino-1′ - methylindolo - (2′.3′ - 6.7) pteridine which comprises condensing 5-nitroso-2.4.6-triaminopyrimidine with O - acetyl - N-methyl-indoxyl in the presence of ethyl alcohol and of piperidine as a condensing agent of the acid binding type.

11. A process for the manufacture of 2.4-diamino - 1′ - methylindolo - (2′.3′ - 6.7) pteridine which comprises condensing 5-nitroso-2.4.6-triaminopyrimidine with O-acetyl - N - methyl-indoxyl in the presence of ethyl alcohol and of dimethylamine as a condensing agent of the acid binding type.

12. A process for the manufacture of 2.4-diamino - indolo - (2′.3′-6.7) pteridine which comprises condensing 5-nitroso-2.4.6-triaminopyrimidine with O-acetyl-indoxyl in the presence of ethyl alcohol and of piperidine as a condensing agent of the acid binding type.

NORMAN ROBERT CAMPBELL.
MAURICE EDWARD HUGH FITZGERALD.
HENRY OSWALD JACKSON COLLIER.
JAMES HENRY DUNSMUIR.

REFERENCES CITED

The following references are of record in the file of this patent:

Hackh Chemical Dictionary, 219–220, third edition (1944).